US012116188B2

(12) United States Patent
Brandenburger et al.

(10) Patent No.: US 12,116,188 B2
(45) Date of Patent: Oct. 15, 2024

(54) SEALING CAP FOR A CONTAINER FOR HOLDING A MEDICAL LIQUID

(71) Applicant: Fresenius Kabi Deutschland GmbH, Bad Homburg (DE)

(72) Inventors: Torsten Brandenburger, Reichelsheim (DE); Christian Frensch, Hofheim (DE); Andreas Pfeffer, Grünberg (DE); Alexander Degen, Bad Homburg (DE)

(73) Assignee: Fresenius Kabi Deutschland GmbH, Bad Homburg (DE)

( * ) Notice: Subject to any disclaimer, the term of this patent is extended or adjusted under 35 U.S.C. 154(b) by 224 days.

(21) Appl. No.: 17/346,647

(22) Filed: Jun. 14, 2021

(65) Prior Publication Data

US 2021/0300643 A1 Sep. 30, 2021

Related U.S. Application Data

(63) Continuation of application No. 16/337,476, filed as application No. PCT/EP2017/074631 on Sep. 28, 2017, now Pat. No. 11,034,491.

(30) Foreign Application Priority Data

Sep. 28, 2016 (EP) .................................... 16191179

(51) Int. Cl.
*B65D 51/00* (2006.01)
*A61J 1/14* (2023.01)

(52) U.S. Cl.
CPC .......... *B65D 51/002* (2013.01); *A61J 1/1406* (2013.01); *A61J 1/1412* (2013.01)

(58) Field of Classification Search
CPC ...... B65D 51/002; A61J 1/1412; A61J 1/1406
USPC .......................................................... 604/415
See application file for complete search history.

(56) References Cited

U.S. PATENT DOCUMENTS

| | | | |
|---|---|---|---|
| 2,906,423 | A | 9/1959 | Ellsworth |
| 3,900,028 | A | 8/1975 | McPhee |
| 4,501,372 | A | 2/1985 | Hansen |
| 4,872,572 | A | 10/1989 | Schrooten |
| 5,678,713 | A | 10/1997 | Derksen |
| 6,221,056 | B1 | 4/2001 | Silverman |

(Continued)

FOREIGN PATENT DOCUMENTS

| | | | |
|---|---|---|---|
| EP | 1457429 | A2 | 9/2004 |
| JP | 2004290218 | A | 10/2004 |

(Continued)

*Primary Examiner* — James N Smalley
(74) *Attorney, Agent, or Firm* — Occhiuti & Rohlicek LLP

(57) ABSTRACT

A sealing cap for a container for holding a medical liquid comprises a cap body and a connection device having a sealing element arranged on the cap body. The sealing element is arranged at the opening and is retained in the cap body in a clamped manner by a, preferably annular, flanged rim. The connection device has a break-off piece, which is firmly connected to the cap body and covers an outer face of the sealing element in the outward direction. The break-off piece is integral with the cap body, is connected to the cap body by a predetermined breaking point where the break-off piece can be detached from the cap body. The sealing element outer face is substantially flat and is accessible for wiping to provide a sealing cap having a sealing element arranged that can be simply and reliably disinfected.

20 Claims, 8 Drawing Sheets

(56) References Cited

U.S. PATENT DOCUMENTS

| | | | | |
|---|---|---|---|---|
| 6,340,359 | B1 * | 1/2002 | Silverman ............ | B65D 51/002 604/415 |
| 7,488,311 | B2 | 2/2009 | Domkowski et al. | |
| 8,162,915 | B2 * | 4/2012 | Brandenburger ..... | A61J 1/1475 604/403 |
| 11,034,491 | B2 | 6/2021 | Brandenburger et al. | |
| 2003/0121878 | A1 * | 7/2003 | Finneran ............... | B01L 3/5082 215/355 |
| 2004/0112855 | A1 | 6/2004 | Becker | |
| 2006/0138069 | A1 | 6/2006 | Domkowski et al. | |
| 2011/0245796 | A1 | 10/2011 | Brandenburger et al. | |
| 2011/0266249 | A1 | 11/2011 | Kakutani et al. | |
| 2014/0011292 | A1 | 1/2014 | Lentz et al. | |

FOREIGN PATENT DOCUMENTS

| | | | | |
|---|---|---|---|---|
| JP | 4581331 | B2 | 11/2010 | |
| JP | 2012062104 | A * | 3/2012 | ............ A61J 1/1406 |
| WO | 2006/042579 | A1 | 4/2006 | |
| WO | 2008/042939 | A2 | 4/2008 | |
| WO | 2010/066373 | A1 | 6/2010 | |
| WO | WO-2013176587 | A1 * | 11/2013 | ............ A61J 1/1406 |
| WO | 2015/104888 | A1 | 7/2015 | |
| WO | WO-2016098849 | A1 * | 6/2016 | ................ A61J 1/05 |

* cited by examiner

SEALING CAP FOR A CONTAINER FOR HOLDING A MEDICAL LIQUID

CROSS-REFERENCE TO RELATED APPLICATIONS

This application is a continuation of U.S. application Ser. No. 16/337,476, filed Mar. 28, 2019, which is the national phase under 35 USC 371 of international application no. PCT/EP2017/074631, filed Sep. 28, 2017, which claims the benefit of the priority date of European application no. 16191179.7, filed Sep. 28, 2016. The contents of the aforementioned applications are incorporated herein by reference in their entireties.

DESCRIPTION

The invention relates to a sealing cap for a container for holding a medical liquid, according to the preamble of claim 1.

A sealing cap of this type comprises a cap body, which delimits an interior and has at least one opening. On the cap body is arranged at least one connection device, to which a conveying device for feeding a medical liquid into the container or for removing a medical liquid from the container can be connected. The connection device has a sealing element, which is arranged on the cap body and is arranged for sealing closure at the opening. To an outer side of the sealing element that is facing away from the interior, a conveying device can be attached for the connection of the conveying device.

Such a conveying device can be designed, for instance, as a syringe, which is attached with an injection cannula to the sealing element and can be introduced into the sealing element in an attachment direction, so that the sealing element is pierced by the injection cannula. Such a syringe is used in particular to feed a medical liquid into the container. In order to remove a medical liquid from the container, an infusion set, for instance, can on the other hand be used, which infusion set, with a pin, which is also referred to as a spike, is attached in such a way to the sealing element that the sealing element is pierced by the pin and thus an access channel to the container is created.

In a sealing cap known from WO 2006/042579 A1, two connection devices, each having a sealing element, are provided. One of these connection devices serves to feed a medical liquid into a container, for instance a bottle, connected to the sealing cap, while the other connection device serves to remove a medical liquid from the container. The content of this Patent Application is incorporated fully into the present Patent Application by reference and, in particular, with reference to FIGS. 3.*a* and 3.*b* and the description thereof.

In another sealing cap known from WO 2010/066373 A1, three connection devices are provided, of which a first serves for the feeding of a medical liquid by means of a syringe, a second for the removal of a medical liquid by means of an infusion set comprising a pin, and a third to provide a so-called needle-free access. The sealing element of the third connection device has a slotted opening, which enables a conveying device, for instance a syringe, to be attached with a—needleless—connection fitting to the sealing element in order to open the sealing element and in this way feed a liquid to the container.

Legal requirements can make it necessary to wipe or dab the sealing element on its outer side prior to the attachment of a conveying device, for instance a syringe for feeding of a medical liquid or an infusion set for removing a medical liquid, for disinfection purposes.

In EP 1 457 429 A2, an overcap serving for pharmaceutical use and having a sealing stopper made of a soft material is described. The overcap has an end-face opening, in which the connection plug, following removal of a protective cover, is exposed for puncturing of a removal cannula. The sealing stopper is weld-connected to the overcap. The welding occurs in the absence of the protective cover which finally covers over the end face. The protective cover can consist of plastic. An aluminum foil can also be used.

The general object of the present invention is to provide a sealing cap in which the disinfection of a sealing element arranged thereon is simplified. In particular, it is an object of the present invention to provide a sealing cap in which a sealing element is firstly securely positioned and closed and the ease of use of the sealing cap improved, for example a possibly necessary disinfection of the sealing element is simplified.

This object is achieved by an article having the features of claim 1. The sealing cap according to the invention seals an access channel to a container. For instance, the sealing cap seals the opening in the bottleneck of a bottle.

In detail, the invention is described by a sealing cap for a container, in particular for attachment to a container, for holding a medical liquid, comprising

- a cap body, which delimits an interior and has at least one opening, and
- at least a first connection device, which is arranged on the cap body and to which a conveying device for removing a medical liquid from the container is connectable, wherein the first connection device has a sealing element arranged on the cap body, which sealing element is arranged for sealing closure at the opening and has an outer side which is facing away from the interior and to which the conveying device is attachable for the connection of the conveying device in an attachment direction (A), in particular wherein the sealing element is held clampingly in the cap body via a holding device, in particular a, preferably annular, beaded rim,
- wherein the first connection device has a break-off piece, which in an initial state is fixedly connected to the cap body and outwardly covers the outer side of the sealing element, and
- the break-off piece is configured, in particular, integrally with the cap body, and connected to the cap body via a predetermined breaking point in such a way that the break-off piece is detachable from the cap body along the predetermined breaking point.

The sealing element is, on its outer side, of flat or substantially flat configuration. The sealing element is in particular arranged in such a way in the first close-off device that the outer side of the sealing element, following the detachment of the break-off piece, is accessible for wiping.

It can thereby be ensured that, following wiping or dabbing, no disinfecting liquid remains on the sealing element, but can be removed in a reliable, simple manner by wiping or dabbing. Access can be readily gained to the sealing element by brushing along the top side with a suitable disinfecting tool, for instance a swab or a wipe, in order in this way to dab or wipe the sealing element on its outer side.

The outer side of the sealing element corresponds to that side of the sealing element which, following the removal of the break-off piece, is visible from the outside and to which a conveying device, for instance a syringe, or preferredly an infusion set or else some other conveying device, can be attached. The outer side is thus also accessible from outside in order to connect a conveying device to the sealing cap. In one embodiment, the sealing element of the first connection device possesses a central thickness of 2 mm to 5 mm and/or a total diameter of 4 mm to 14 mm.

The outer side is advantageously a component part of a sealing head of the sealing element, which sealing head extends through the opening. The sealing element lies with its sealing head in the opening and in this way seals the opening, wherein the outer side configured on the sealing head points outward and is thus facing away from the interior of the sealing cap. In one embodiment, the sealing head possesses a diameter of 2 mm to 10 mm, preferably of 5 mm to 8 mm. In particular, the opening in the sealing cap also possesses a diameter of 2 mm to 10 mm, preferably of 5 mm to 8 mm. There is thereby provided a large access channel, which is compatible, in particular, with a large number of different infusion sets. Preferably, the sealing head is, at least in part, of slotted configuration. In one embodiment, the slot is punched into the sealing head. The introduction of a spike can thereby be facilitated. The slot extends preferably from the outer side to a depth of 0.5 mm to 2 mm. In one embodiment, the slot is a cross slot. The visibility of the puncture site in the sealing element can thereby be improved.

In one embodiment, the first connection device comprises on an outer side of the sealing cap a, preferably circular, elevation. A plateau is provided on the sealing cap. The opening of the first connection device is arranged, preferably concentrically, in the elevation. In particular, the stability of the first connection device, for example upon insertion of a spike, can thereby be improved.

In a further embodiment, on the outer side of the sealing element is arranged a marking, which runs at least partially around the puncture site. The puncture region can thereby be defined or marked still further. Preferably, the marking is provided by an at least partially circumferential web. For instance, the marking or the web extends as a, preferably broken, circle around the puncture site. In particular in conjunction with the cross slot, a type of target can be formed, so that a user can directly recognize the puncture site for the spike. The visibility of the target can in particular also be improved by the elevation, in which the opening of the first connection device is arranged.

For instance, the sealing element can have a sealing head, which forms the outer side, and a sealing body, which adjoins the sealing head. The sealing body can be connected via a peripherally circumferential flange to a ring collar, wherein by means of this ring collar a clamping connection to the sealing cap is established. Toward the outer side of the sealing element, the flange extends such that, between the sealing head and the ring collar, a recess is formed. Toward the inner side of the sealing element, the sealing body and the flange lie in one plane. For instance, the ring collar can lie in an associated recess of the sealing cap and be clampingly held there, so that, via the ring collar, the sealing element is connected to the sealing cap. Preferably, the sealing element is clampingly held via a beaded rim. The beaded rim is provided by a bent-over wall portion. The sealing element is preferably held in the cap body, in particular in the holding device, solely by means of clamping.

For the connection of a conveying device, an injection cannula, or preferredly a pin, of the conveying device can be attached to the outer side of the sealing element in order to pierce the sealing element. The sealing element is herein pushed aside, wherein the ring collar remains on the associated holding device of the sealing cap and the sealing element is thus held in position on the sealing cap. If the conveying device is in turn removed from the sealing cap, then the sealing element automatically closes, so that the opening of the sealing cap is in turn sealed against the passage of liquid, in particular against a running of liquid out of the container. In a preferred embodiment, the sealing element is a resealable sealing element. Where appropriate, the sealing element, in particular the sealing element for the connection of a pin, can be slotted at least in some sections, or throughout.

In an initial state, a break-off piece is preferably connected in such a way to the cap body that the sealing element is completely covered in the outward direction. The break-off piece herein encloses the outer side of the sealing element and thus closes off the outer side in the outward direction, so that no dirt in the form of solid or liquid contaminations can make its way onto the outer side.

The break-off piece is in the initial state advantageously connected integrally, i.e. in one piece, to the sealing cap. The sealing cap can herein, for instance, be made together with the break-off piece as a plastics molding, for instance by means of plastic injection molding. The break-off piece is connected to the cap body via a predetermined breaking point such that the break-off piece can be separated, in particular broken off, from the cap body along the predetermined breaking point in order to remove the break-off piece from the cap body.

In an advantageous embodiment, the predetermined breaking point runs around the opening, so that the break-off piece, along a connecting line running around the opening, is connected to the cap body, and can be separated from the cap body along this connecting line in order to clear the sealing element and to be able to attach a conveying device to the outer side of the sealing element. In one embodiment of the cap, at least a marginal region of the outer side of the sealing element is substantially aligned with the adjacent predetermined breaking line. The accessibility of the sealing element outer side can thereby be improved. Preferably, the outer side of the sealing element is substantially aligned with the adjacent predetermined breaking line.

In one embodiment, an interior or space between the break-off piece and the outer side of the sealing element is provided sterile. The outer side of the sealing element is thus sterile already in the state in which the break-off piece is still connected to the sealing cap. A disinfection of the outer side of the sealing element following the removal of the break-off piece and prior to the attachment of a conveying device, in particular by means of wiping or dabbing, is in this case no longer necessary per se. If, however, legal requirements, for instance, render such disinfection necessary, this additional disinfection can, in particular, be performed more easily as a result of the good accessibility of the outer side of the sealing element.

For instance, the sealing cap in one specific embodiment, apart from the above-described first connection device for removing a medical liquid, can further have a second connection device for feeding of a medical liquid. On the sealing cap are thus provided two connection devices, of which one is designed, in particular, for the removal of a medical liquid, and of which the other is designed, in particular, for the feeding of a medical liquid.

The connection devices can herein be differently configured in order to enable the connection of different conveying devices, for instance a syringe or an infusion set. The sealing elements of the connection devices can also be differently configured. The sealing element of the second connection device can herein be configured, in particular, for the attachment of a syringe, while the sealing element of the first connection device is configured, in particular, for an attachment of a pin of an infusion set or the like. The sealing elements can thus be adapted in particular manner, for instance in terms of their thickness to be pierced, to enable a favorable connection of a syringe or an infusion set or the like. Also the sealing element of the second connection device is preferably a resealable sealing element. Preferably, the sealing element of the second connection device possesses an at least partially concave outer side.

The sealing element of the second connection device can have a sealing head, which forms the outer side, and a sealing body, which adjoins the sealing head. The sealing body is in this case not secured to a holding device of the cap body via a circumferential ring collar attached via a flange, but is held directly, via a marginal portion, on a second holding device of the cap body. In this way, this second sealing element can be designed, in particular, for piercing by means of an injection cannula. Because such an injection cannula has a comparatively small cross section, when the injection cannula is inserted a lesser deformation ensues on the sealing element in comparison to the insertion of a pin, for instance, of an infusion set. The sealing element is preferably held in the cap body, in particular in the holding device, solely by means of clamping.

The sealing elements of the different connection devices can in this variant be different, in particular in terms of their thicknesses, in order to adapt the connection devices to the different conveying devices. The sealing element of the second connection device (second sealing element), which can serve for the attachment of an injection cannula of a syringe, can in particular have a greater thickness than the sealing element of the first connection device (first sealing element), which is adapted, for instance, for the attachment of a pin of an infusion set. Preferably, the first sealing element possesses a central thickness of 2 mm to 6 mm, preferredly of 3 mm to 4 mm. Preferably, the second sealing element possesses a central thickness of 2 mm to 6 mm, preferredly of 3 mm to 4 mm.

The sealing elements can have an at least approximately rotationally symmetric shape. For instance, the sealing head and the sealing body can respectively be of at least approximately cylindrical configuration, wherein the outer side of the sealing head, which points outward, is of substantially flat or concave configuration.

In one embodiment, the bottom side of the first and/or second sealing element, which provides the inner side, is substantially flat. In the first sealing element, the top side of the ring collar is situated lower than the top side of the sealing head, and/or the bottom side of the ring collar is situated lower than the bottom side of the sealing body.

Preferably, the first sealing element possesses a total diameter of 8 mm to 14 mm, preferredly of 10 mm to 12 mm. Preferably, the second sealing element possesses a total diameter of 4 mm to 11 mm, preferredly of 6 mm to 9 mm. In one embodiment, the sealing head of the first sealing element possesses a diameter of 4 mm to 10 mm, preferredly of 5 mm to 8 mm, and/or the sealing head of the second sealing element a diameter of 2 mm to 8 mm, preferredly of 3 mm to 6 mm.

In a further embodiment, the sealing element of the first connection device and/or the sealing element of the second connection device has at least one spacer. The spacers have the effect that the sealing elements, when in storage, cannot stick together with their large surfaces. The spacers are in particular arranged wherever the sealing effect of the sealing elements is not impaired. They are preferably in one piece with the sealing element. In the case of the sealing element of the first connection device, a plurality of spacers are arranged in particular on the top side and/or bottom side of the ring collar, distributed over the periphery. The spacers are configured, by way of example, as elevations or webs. These can extend, by way of example, radially outward. In the case of the sealing element of the second connection device, a plurality of spacers are arranged distributed in particular on the bottom side of the sealing element. The spacers are configured, for example, as small bosses. The spacers prevent or reduce adhesion of the sealing elements during storage. An automated gripping and insertion of the sealing elements into the cap body can thereby be facilitated.

Also lying within the scope of the invention is a sealing element per se, in particular for the above-described sealing cap according to the invention, preferably for the first connection device. The sealing element comprises a sealing head, which provides the outer side of the sealing element, a sealing body adjoining the sealing head, and a ring collar connected to the sealing body via a flange. The outer side of the sealing element is substantially flat and lies above a top side of the ring collar. The sealing element is characterized in that a puncture site in the sealing head is configured at least partially slotted with a cross slot, and around the puncture site is arranged a partially or, at least partially, circumferential marking. The sealing element is preferably a sealing element for connection to a pin. The sealing element can, apart from the below-stated features, also have those features of the sealing element of the first connection device which are stated in the description and the claims.

As a result of the design of the slot as a cross slot, in particular the visibility of the puncture site in the sealing element and/or the puncturing behavior of a spike can be improved. The slot extends preferably from the outer side to a depth of 0.5 mm to 2 mm.

In one embodiment, the marking extends as a, preferably broken, circle around the puncture site. The puncture site and the marking are arranged preferably concentrically. In particular in conjunction with the cross slot, a type of target can be formed, so that a user can directly recognize the puncture site for the spike. The marking can be provided, for instance, by an at least partially circumferential burr or web.

In a further embodiment, on the top side of the ring collar and/or on the bottom side of the ring collar, a plurality of spacers are arranged distributed over the periphery. The spacers are configured, by way of example, as elevations or webs. The spacers prevent or reduce an adhesion of the sealing elements during storage. An automated gripping and insertion of the sealing elements into the cap body can thereby be facilitated.

In addition, also lying within the scope of the invention is a container, preferably a bottle, which comprises an above-described sealing cap according to the invention or an above-described sealing element. The bottle can be produced, for example, by means of SBM (Stretch-Blow-Molding) or BFS (Blow-Fill-Seal). The bottle and the sealing cap can be connected to one another in particular by means of clamping, gluing and/or welding. Preferably, the bottle is filled with an infusion solution.

The idea underlying the invention shall be explained in greater detail below with reference to the illustrative embodiments represented in the figures, wherein.

Figure 1A:
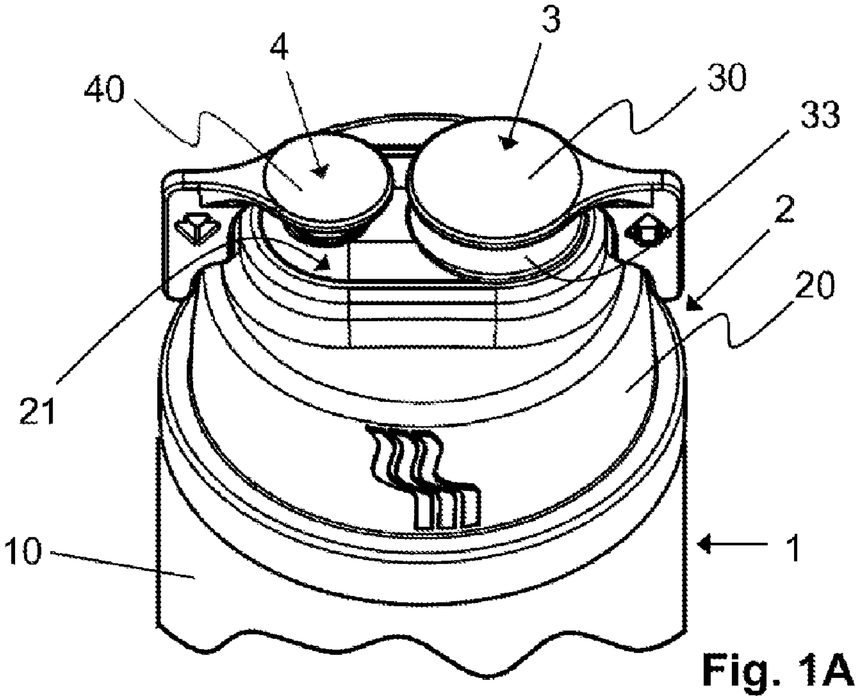
FIG. 1A shows a perspective view of a sealing cap on a—schematically represented—container.
Figure 1B:
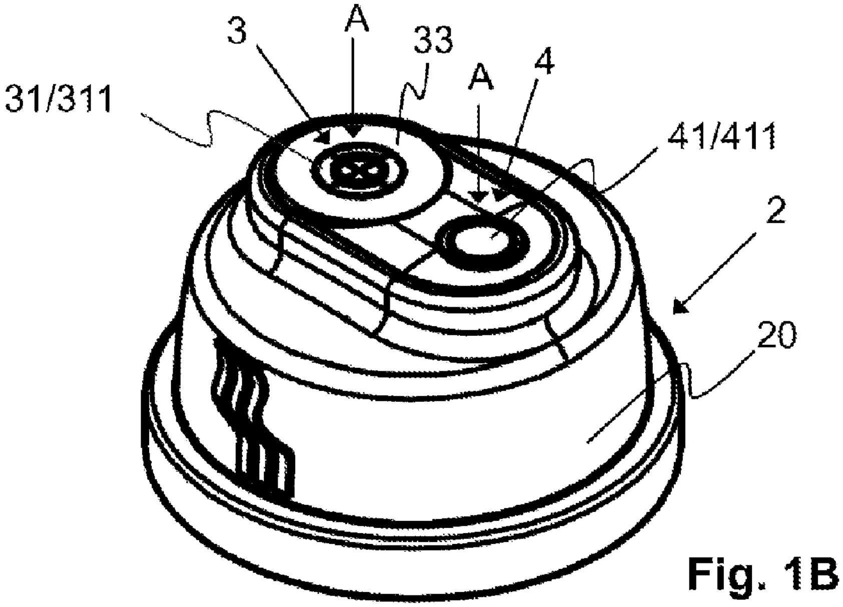
FIG. 1B shows a perspective view of the sealing cap, with removed break-off pieces.

The figures show an illustrative embodiment of a sealing cap 2 which can be attached to a container 1, in particular in the form of a bottle, for instance a plastics bottle or a glass bottle, in order to seal the container 1 to the outside and provide access channels for the filling or removal of a medical liquid.

The sealing cap 2 is attached to a container body 10 of the container 1 and sealingly connected, for instance welded or bonded, to the container body 10.

The sealing cap 2 has a cap body 20, which on a top side 21 has two connection devices 3, 4 for the connection of different conveying devices. The connection devices 3, 4 respectively have a sealing element 31, 41, which is accommodated in a holding device 32, 42 in the form of a positive-locking receptacle on the cap body 20 and is clampingly held on the holding device 32, 42. The sealing element 31 and/or the sealing element 41 is or are held in the cap body, in particular on the holding device 32, 42, solely by means of clamping. In particular, the holding devices 32 and 42 are respectively configured as a, preferably annular, beaded rim.

In the initial state of the sealing cap 2, with not yet inserted sealing elements 31, 41, the holding devices 32, 42 are not yet bent over. The holding devices 32, 42 extend initially downward and form the walls of a type of empty sleeve (not represented in the figures). Into these still empty sleeves 32, 42 are then respectively inserted the two sealing elements 31, 41. For the fixing of the sealing elements 31, 41, the sleeve walls 32, 42 are subsequently bent over in the direction of the inside of the sleeve. The sealing elements 31, 41 are thereby fastened in the respective connection device 3, 4 by means of clamping. In the first connection device 3, the beaded rim 32 extends preferably around the ring collar 314 of the sealing element 31 in an inward and upward direction. The beaded rim 32 undergrips and back-grips the ring collar 314 of the sealing element 31. In contrast, in the second connection device 4, the beaded rim 42 extends around the marginal portion 413 of the sealing element 41 only substantially inward. The beaded rim 42 undergrips substantially only the marginal portion 413 of the sealing element 41. The beaded rim 32 and the beaded rim 42 are thus formed by bent-over wall portions and are also recognizable and distinguishable as such, in particular in relation to an injection-molded portion.

The sealing elements 31, 41 serve to outwardly seal openings 321, 421 on the top side 21 of the cap body 20, wherein, to this end, a respective sealing head 310, 410 of the sealing element 31, 41 projects into the associated opening 321, 421 and sealingly closes this off. With holding devices 32 and 42 initially not bent over, the sealing elements 31, 41 are inserted into the openings 321, 421. For the fixing of the sealing elements 31 and 42, the holding devices 32 and 42 are then bent over.

Figure 2A:
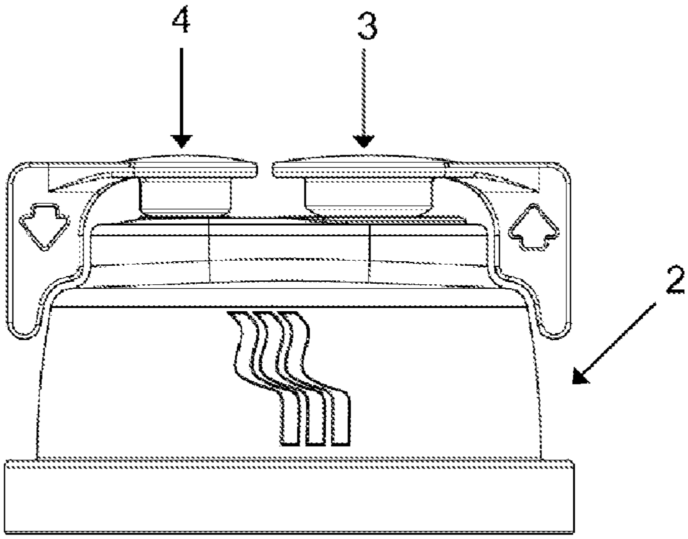
FIG. 2A shows a side view of the sealing cap.
Figure 2B:
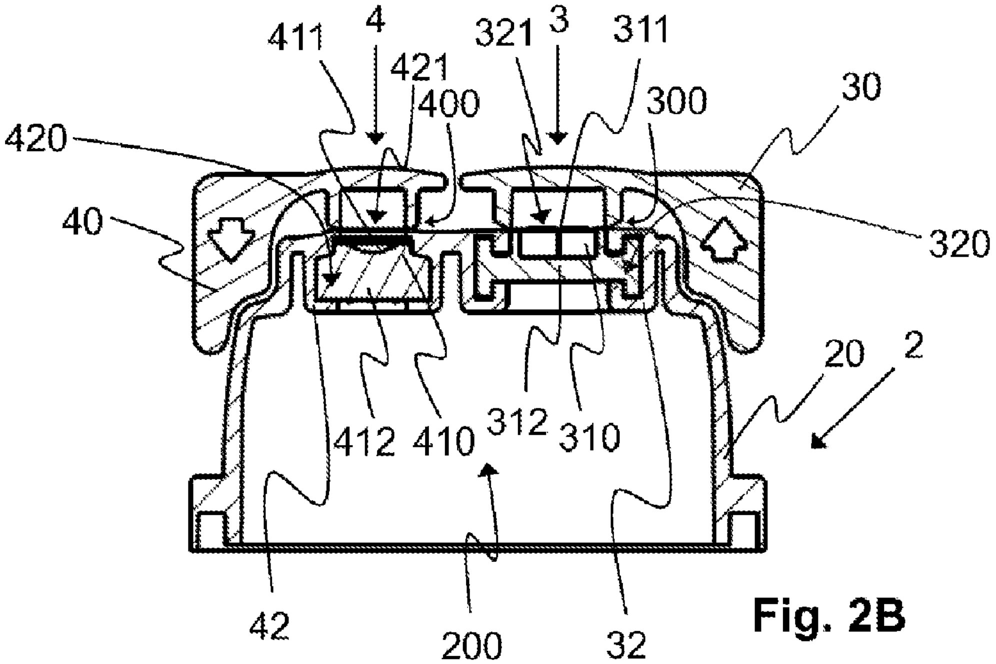
FIG. 2B shows a sectional view of the sealing cap according to FIG. 2A.
Figure 3A:
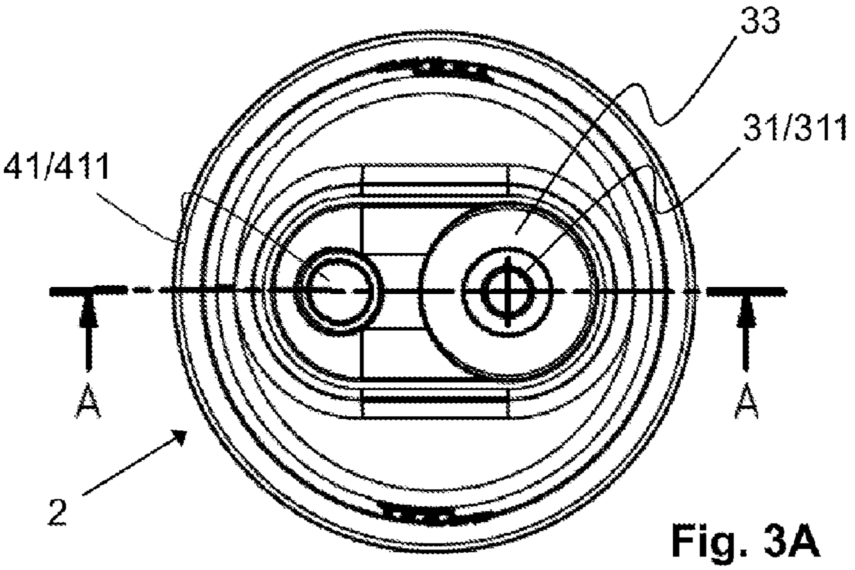
FIG. 3A shows a view onto the top side of the sealing cap, with removed break-off pieces.
Figure 3B:
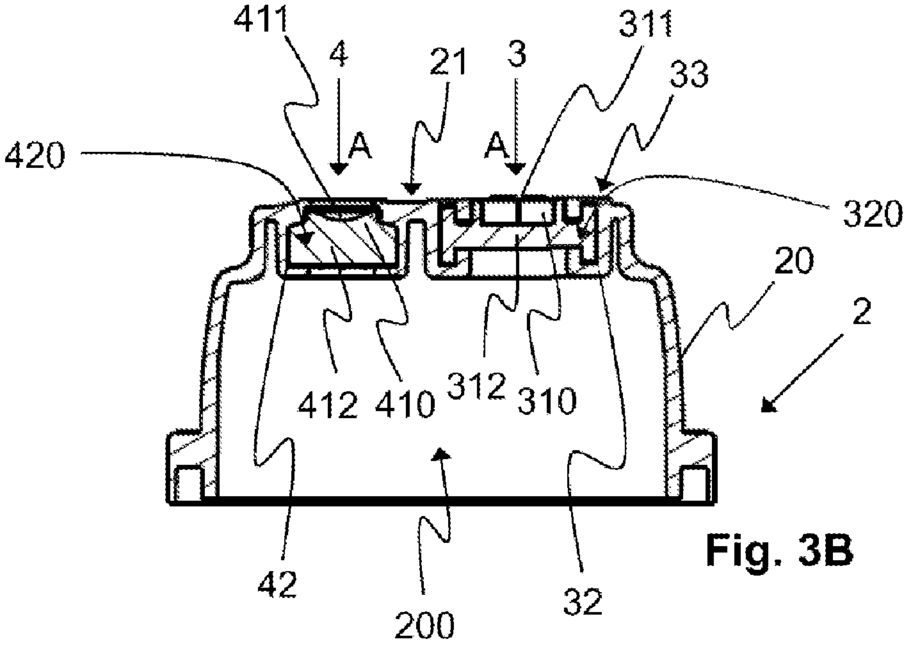
FIG. 3B shows a sectional view (along the sectional line A-A) of the sealing cap according to FIG. 3A, with removed break-off pieces.
Figure 4A:
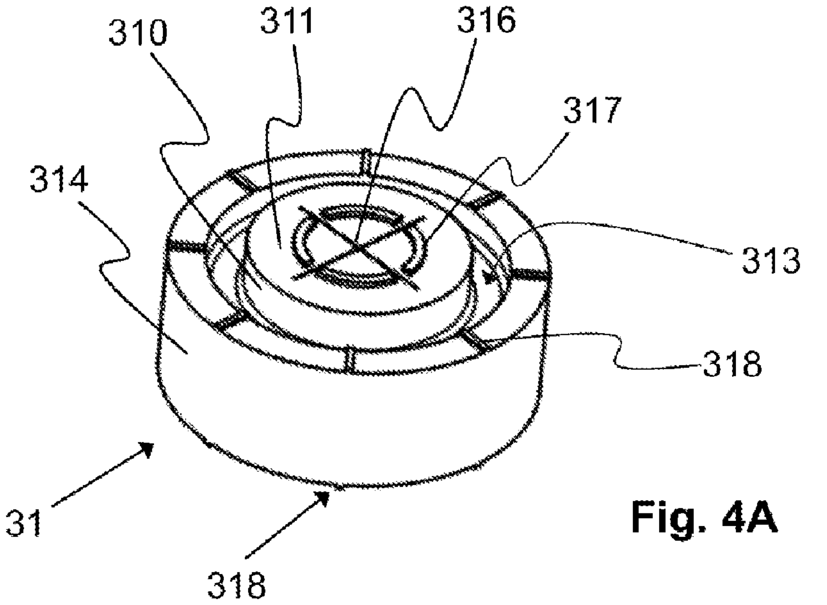
FIG. 4A shows a perspective view onto the top side of the first sealing element.
Figure 4B:
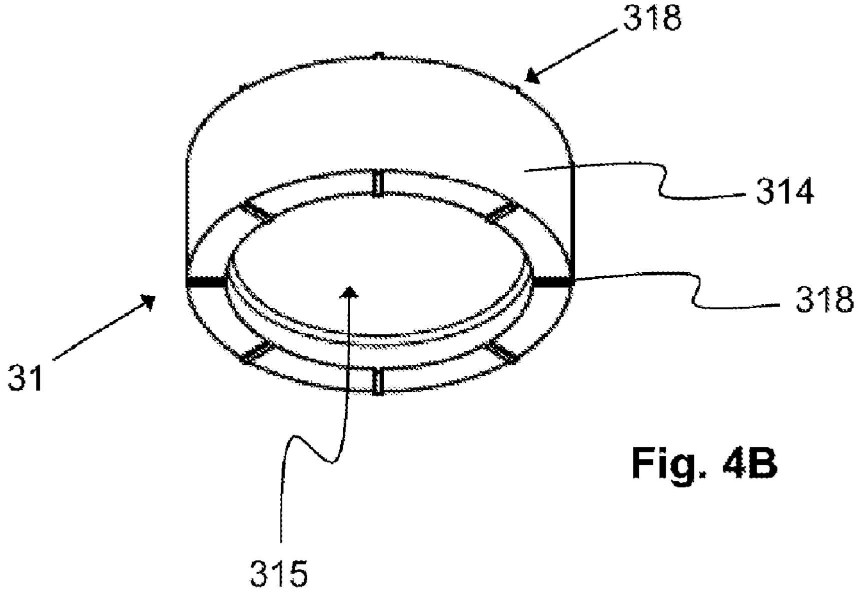
FIG. 4B shows a perspective view onto the bottom side of the first sealing element.
Figure 4C:
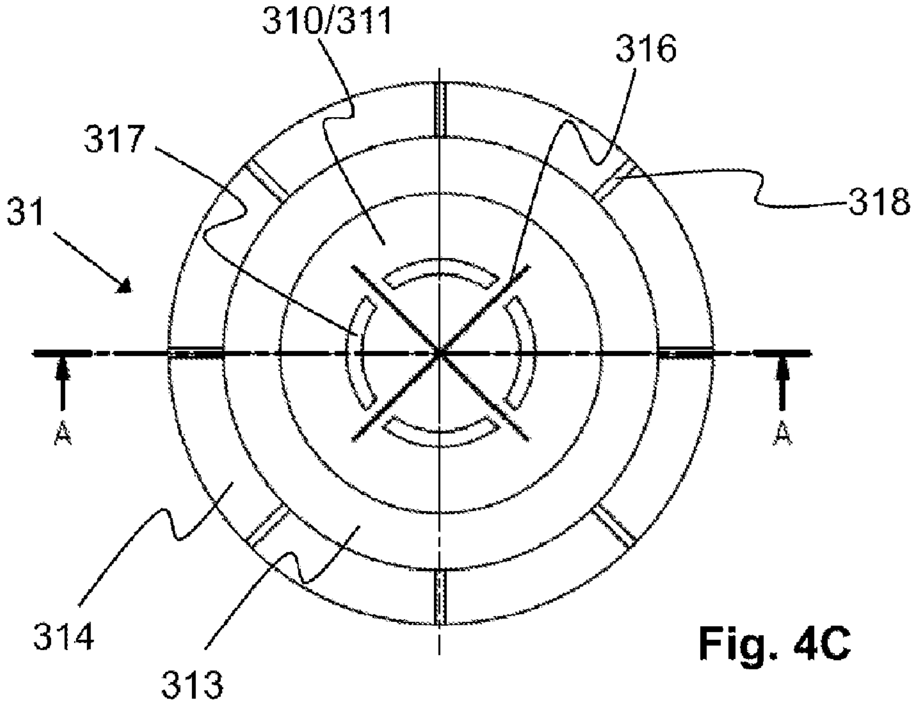
FIG. 4C shows a view onto the top side of the first sealing element.
Figure 4D:
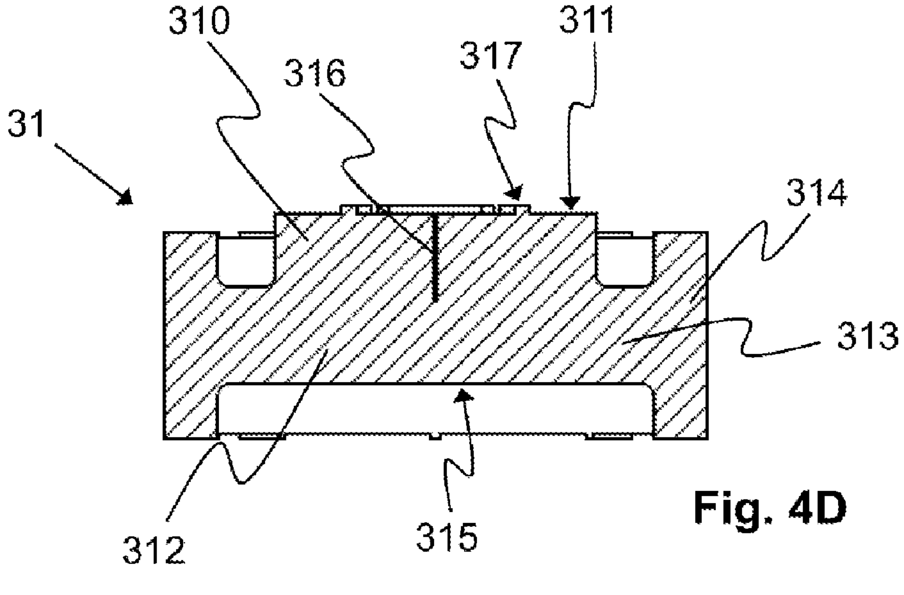
FIG. 4D shows a sectional view (along the sectional line A-A) of the first sealing element from FIG. 4C.
Figure 5A:
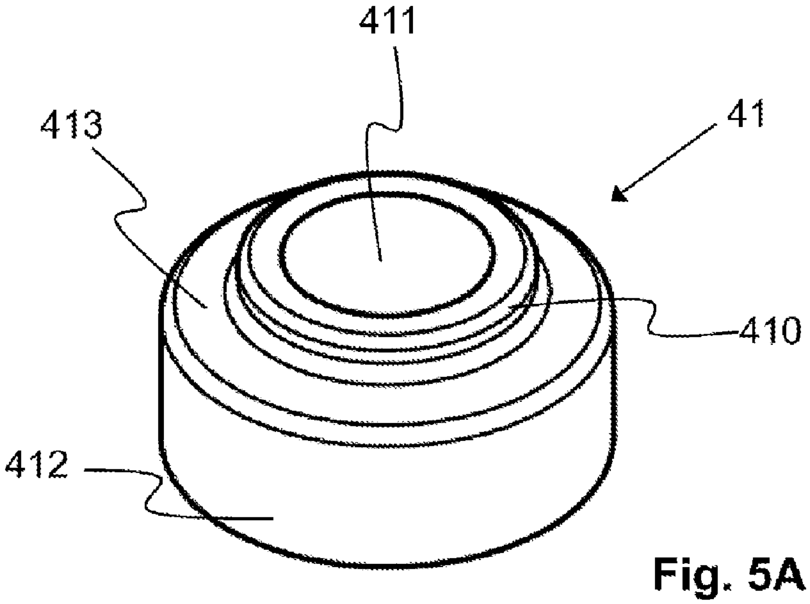
FIG. 5A shows a perspective view onto the top side of the second sealing element.
Figure 5B:
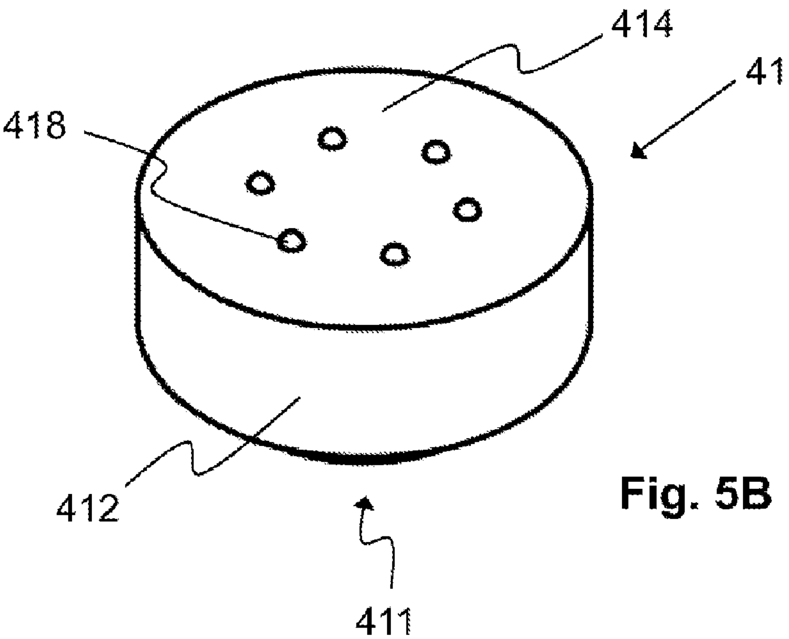
FIG. 5B shows a perspective view onto the bottom side of the second sealing element.
Figure 5C:
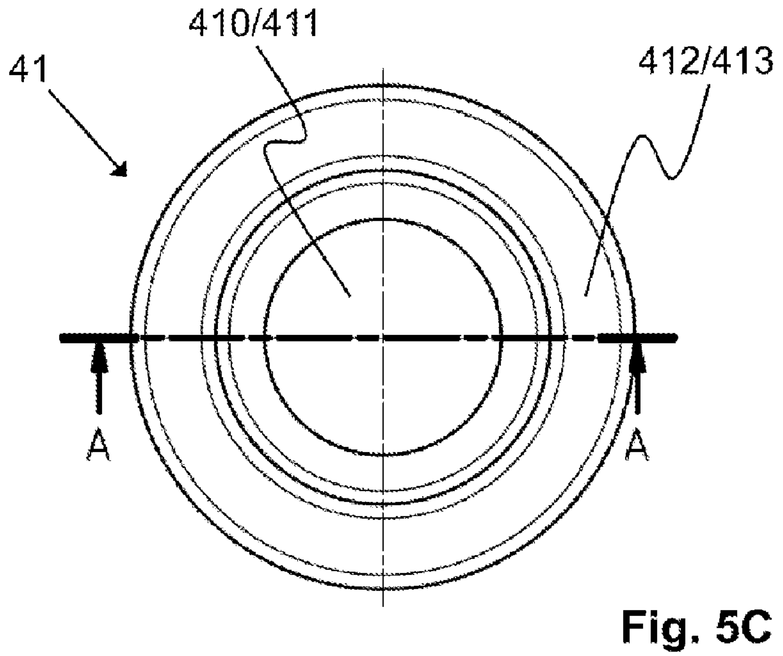
FIG. 5C shows a view onto the top side of the second sealing element.
Figure 5D:
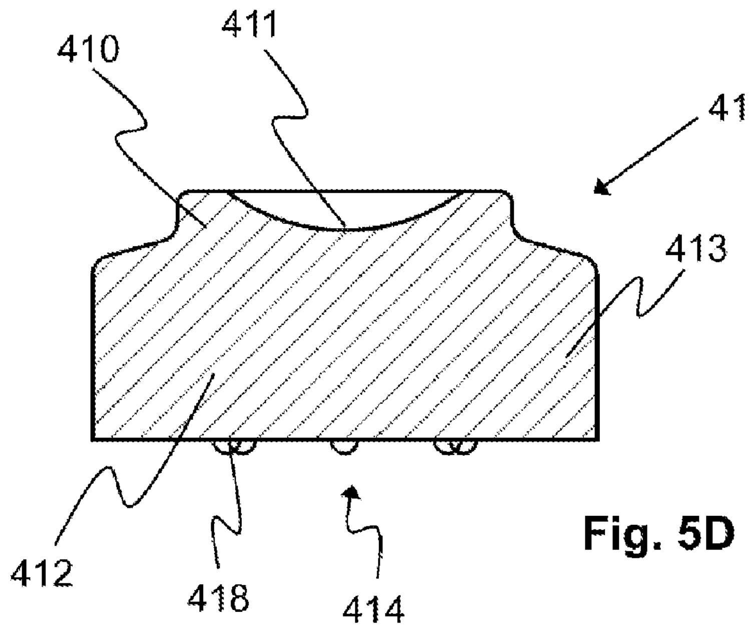
FIG. 5D shows a sectional view (along the sectional line A-A) of the second sealing element from FIG. 5C.
Figure 6:
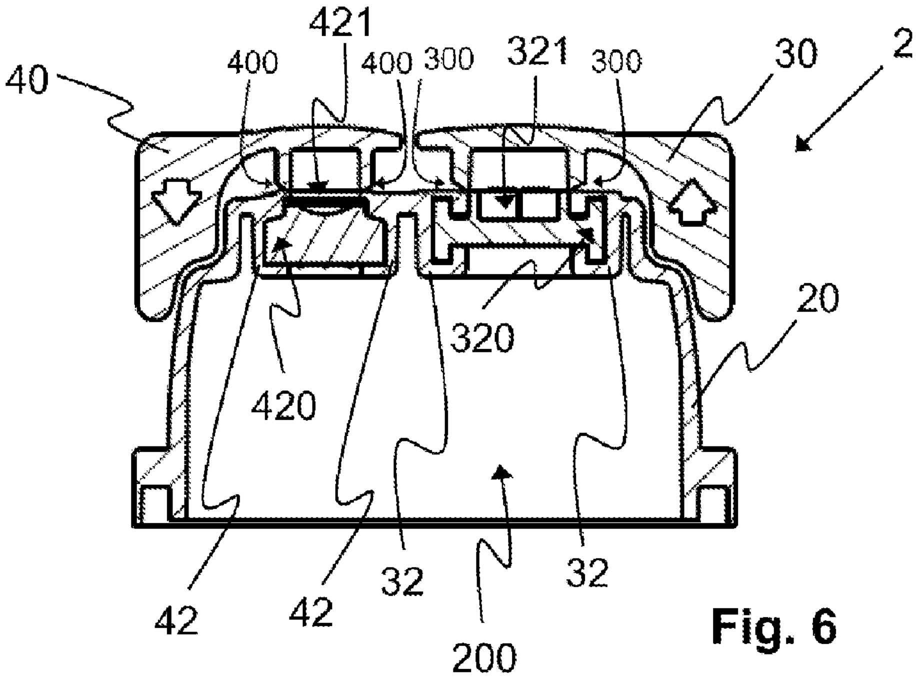
FIG. 6 shows the same illustration as in FIG. 2B with further reference symbols.

The connection devices 3, 4 are in an initial state, represented in FIGS. 1A, 2A and 2B, respectively covered via a break-off piece 30, 40 and sealed in the outward direction in such a way that the openings 321, 421, with the sealing elements 31, 41 arranged therein, are not accessible from the outside and are protected against contamination. Preferably, the interior formed by the break-off piece 30, 40 is sterile.

The first connection device 3 comprises on its top side a further elevation 33. The elevation 33 extends out of the top side of the sealing cap 2. The outer rim of the opening 321 is arranged in the outer side of the elevation 33. The elevation 33 is here a circular elevation 33, which extends in particular concentrically around the opening 321. In particular, the visibility and/or accessibility of the puncture site in the connection device 3 can thereby be improved. In particular, the stability of the first connection device 3, for example upon insertion of a spike, can also be improved. The elevation 33 has, at the transition to the top side of the sealing cap 2 toward the outer side, a larger step than to the center of the sealing cap 2.

A first connection device 3 serves for the removal of a medical liquid from the container 1. By contrast, another, second connection device 4 serves for the feeding of a medical liquid into the container 1. The removal of a medical liquid is realized via a conveying device in the form of a removal device formed, for instance, by an infusion set, which removal device has a pin of comparatively large cross section and can be attached with the pin to the sealing element 31 of the associated connection device 3. The feeding of a medical liquid is realized, by contrast, via a conveying device in the form of a syringe, which can be attached with an injection cannula to the sealing element 41 of the associated, second connection device 4 in order to pierce the sealing element 41.

Because the pin of the removal device has a comparatively large cross section, the associated opening 321 of the connection device 3 is also comparatively large, and correspondingly, the, in its basic shape, rotationally symmetric sealing element 31 has a sealing head 310 of comparatively larger diameter. Preferably, the sealing head 310 of the first sealing element 31 possesses a diameter of preferredly from 5 mm to 8 mm, and/or the sealing head 410 of the second sealing element 41 a diameter of 4 mm to 6 mm.

By contrast, the opening 421 of the other, second connection device 4 is smaller, and correspondingly, the sealing head 410 of the second sealing element 41, which sealing head is extended into the opening, has a comparatively smaller diameter.

Detailed, separate illustrations of the sealing elements 31, 41 are represented in FIGS. 4A-4D and FIGS. 5A-5D.

The first sealing element 31 has a sealing head 310 having an outward pointing, substantially flat outer side 311. Adjoining the sealing head 310—to the rear of the outer side 311—is a sealing body 312, which is connected via a circumferential flange 313 to a likewise peripherally circumferential ring collar 314. Via the ring collar 314, the sealing element 31 lies in an opening 320 of the holding device 32 and is by this means held clampingly on the holding device 32. A bottom side 315 of the sealing element 31 points into an interior 20 of the sealing cap 2 (see, for example, FIG. 4B). The bottom side 315 of the first sealing element 31 is here substantially flat. In the first sealing element 31, the top side of the ring collar 314 is situated lower than the outer side or top side 311 of the sealing head 310. Moreover, the bottom side of the ring collar 314 is situated lower than the inner side or bottom side 315 of the first sealing body 31. The ring collar 314 thus extends beyond the bottom side 315.

The other, second sealing element 41 likewise has a rotationally symmetric shape and consists of a sealing head 410, which, to the rear of a substantially concavely curved outer side 411, is adjoined by a cylindrical sealing body 412. Via this cylindrical sealing body 412, the sealing element 41 is secured directly in an opening 420 of the associated, second holding device 42, in that a marginal portion 413 of the sealing element 41 is held clampingly in the opening 420 of the holding device 42. A bottom side 414 of the sealing element 41 points toward the interior 200 of the sealing cap 2. The bottom side 414 of the second sealing element 41 is here substantially flat.

The maximum thickness—viewed along an attachment direction A in which a conveying device is to be attached to a respectively associated sealing element 31, 41—of the first sealing element 31, measured between the outer side 311 and the inner side 315, is smaller than the maximum thickness of the other, second sealing element 41, in turn measured between the outer side 411 and the inner side 414. The different shaping in terms of diameter and thickness is dictated by the fact that, upon the attachment of a pin, the associated, first sealing element 31 has to be pushed aside to a substantially greater extent than when an injection cannula is attached to the associated, second sealing element 41. Upon the attachment of a pin, the first sealing element 31 can thus be favorably pierced and displaced. The same applies to the second sealing element 41 upon attachment of an injection cannula.

Both sealing elements 31, 41 reseal themselves automatically when the respectively associated conveying device is in turn removed from the connection device 3, 4.

Because the sealing element 31 is on its outer side 311 substantially flat and is substantially aligned with the top side 21 of the cap body 20, the sealing element 31 can be favorably dabbed or wiped for disinfection purposes, as can possibly be prescribed by legal requirements. Preferably, the outer side of the sealing element 31 lies substantially in the same plane as the upper rim of the opening 321. Preferably, the rim of the outer side of the sealing element 41 also lies substantially in the same plane as the rim of the opening 421. It can also be situated somewhat lower. Due to the concave outer side 411, the center of the sealing element 41 is situated lower than the upper rim of the opening 421. Preferably, the central region of the sealing head 410 possesses a, by 0.1 to 1 mm, lower thickness than the marginal region of the sealing head 410. In particular, due to the shaping of the sealing elements 31, 41 on their outer sides 311, 411 and the positioning in the openings 321, 421, it is possible to ensure that the outer sides 311, 411 can be reached by a suitable disinfecting tool, for instance a swab or a wiping cloth.

For the attachment of a conveying device to an associated connection device 3, 4, the following procedure is basically adopted.

In an initial state, the sealing cap 2 connected to the container 1 is present with break-off pieces 30, 40 fixedly arranged thereon. The break-off pieces 30, 40 are configured integrally with the cap body 20 and are connected to the cap body 20 via circumferential predetermined breaking points 300, 400 in such a way that the outer sides 311, 411 of the sealing elements 31, 41 are outwardly covered.

If a conveying device is intended to be attached to an associated connection device 3, 4, then the respective break-off piece 30, 40 is removed from the cap body 20 by a user gripping the break-off piece 30, 40 between his fingers and breaking it off from the cap body 20 along the predetermined breaking point 300, 400. In this way, the respective sealing element 31, 41 is exposed, so that the conveying device can be attached to the outer side 311, 411 of the sealing element 31, 41 (not represented in the figures).

By means of a suitable puncturing tool, the sealing element 31, 41 is now pierced, so that a flow connection between a body of the respective conveying device and the inside of the container 1 is created, so that a medical liquid can be filled into the container 1 or removed from the container 1.

In order to facilitate the insertion of a spike into the sealing element 31, the sealing element 31, starting from its outer side 311, is partially slotted. The slot 316 is here configured as a cross slot (see, in this regard, in particular FIGS. 4A to 4D). This cross slot 316 serves at the same time also as a marking in order to highlight the puncture region to the user. In order to still further improve the visibility of the puncture site, on the outer side 311 of the sealing element 31 are further arranged elevations or webs 317. The insertion region for the spike on the outer side 311 of the sealing element 31, which insertion region is defined by the intersecting slots 316, is additionally enclosed by an annularly circumferential web 317. The annularly circumferential web 317 is respectively broken at several places. The slots 316 extend through the gaps. As a result, a type of target is provided for the user. The webs 317 can lie level with the opening rim of the opening 321, or else project somewhat beyond the top side 21 of the cap 2. That is dependent on the contact pressure with which the sealing element 31 is fixed in the opening 321.

On the top side and bottom side of the ring collar 314 (of the sealing element 31), a plurality of spacers 318 are arranged distributed over the periphery. The spacers 318 are configured as elevations or webs. These here extend, by way of example, radially outward. Similarly, a plurality of spacers 418 are arranged distributed on the inner side or bottom side 414 of the sealing element 41. The spacers 418 are here configured as small bosses. These spacers 318, 418 prevent or reduce adhesion of the sealing elements 31, 41 during storage. An automated gripping and insertion of the sealing elements 31, 41 into the cap body 20 can thereby be facilitated.

The sealing cap 2 can, with its cap body 20, preferably be made of plastic, for instance by means of plastic injection molding. The break-off pieces 30, 40 of the connection devices 3, 4 are herein initially formed in one piece with the cap body and can be broken off from the cap body 20 in order to gain access to one of the sealing elements 31, 41.

While the cap body 20 is made of a comparatively rigid plastics material, the sealing elements 31, 41 are made of a comparatively soft, elastic material, for instance polyisoprene or a thermoplastic elastomer.

The idea underlying the invention is not limited to the previously depicted illustrative embodiments, but is in principle also able to be implemented in embodiments of wholly different type.

Since the outward pointing outer side of the sealing elements is easily accessible, the sealing elements can on their outer sides be wiped or dabbed in a simple, effective manner for disinfection purposes.

In principle, a sealing cap can also have just one connection device, having a sealing element, or more than two connection devices, each having a sealing element.

REFERENCE SYMBOL LIST

1 container
10 container body
2 sealing cap
20 cap body
200 interior
21 top side
3 connection device
30 break-off piece
300 predetermined breaking point
31 sealing element
310 sealing head
311 outer side
312 sealing body
313 flange
314 ring collar
315 inner side
316 slot or cross slot
317 marking or burr
318 spacer or web
32 holding device or beaded rim
33 elevation
320 opening
321 opening
4 connection device
40 break-off piece
400 predetermined breaking point
41 sealing element
410 sealing head
411 outer side
412 sealing body
413 marginal portion
414 inner side
418 spacer or boss
42 holding device or beaded rim
420 opening
421 opening
A attachment direction

The invention claimed is:

1. A sealing element for a connection device of a container for holding a medical liquid, comprising a sealing head, on an outer side of the sealing element, a sealing body adjoining the sealing head, and a ring collar connected to the sealing body via a flange, wherein the outer side of the sealing element is substantially flat and disposed above a top side of the ring collar, wherein a puncture site in the sealing head is at least partially slotted with a cross slot, and/or a marking that is at least partially circumferential and arranged around the puncture site wherein on the top side of the ring collar and/or on a bottom side of the ring collar, a plurality of spacers are arranged distributed over the periphery.

2. The sealing element of claim 1, wherein a bottom side of the ring collar is situated lower than a bottom side of the sealing body and the ring collar thus extends beyond the bottom side of the sealing body.

3. The sealing element of claim 2, wherein the bottom side of the first sealing element is substantially flat.

4. The sealing element of claim 1, wherein the sealing element is shaped to be pierced by a spike of a conveying device.

5. The sealing element of claim 1, wherein the sealing element reseals automatically when a conveying device is removed from the sealing element.

6. The sealing element of claim 1, wherein the marking extends as a broken circle around the puncture site.

7. The sealing element of claim 1, wherein the marking comprises an at least partially circumferential burr.

8. The sealing element of claim 1, wherein the cross slot extends from an outer side of the sealing element into the sealing body of the sealing element to a depth of 0.5 mm to 2 mm.

9. The sealing element of claim 1, wherein the sealing element has at least one spacer.

10. The sealing element of claim 1, wherein the plurality of spacers comprise elevations or webs that extend radially outward form a central axis of rotation of the sealing element or the plurality of spaces comprise raised bosses distributed on a bottom side of the sealing element.

11. The sealing element of claim 1, wherein the sealing element possesses a central thickness of 2 mm to 6 mm, and/or a total diameter of 4 mm to 14 mm.

12. The sealing element of claim 1, wherein the sealing element possesses a central thickness of 3 mm to 4 mm, and/or a total diameter of 10 mm to 12 mm.

13. The sealing element of claim 1, wherein the sealing head possesses a diameter of 2 mm to 10 mm and/or the first sealing element possesses a total diameter of 8 mm to 14 mm.

14. The sealing element of claim 1, wherein the sealing head possesses a diameter of 5 mm to 8 mm and/or the sealing element possesses a total diameter of 10 mm to 12 mm.

15. The sealing element of claim 1, wherein the outer side of the sealing element is substantially flat in a same plane as an upper rim of an opening of a cap body and lies disposed above a top side of the ring collar.

16. The sealing element of claim 1, wherein the sealing element is dimensioned and configured to contact and fit over an opening of a sealing cap for attachment to a container for holding a medical liquid.

17. The sealing element of claim 16, wherein the ring collar is disposed in an associated recess of the sealing cap and clampingly held there, so that, by contact of the ring collar, the sealing element is connected to the sealing cap.

18. The sealing element claim 1, wherein the sealing element is made of an elastic material, softer than a material comprising a cap body, and further comprising a polyisoprene or a thermoplastic elastomer puncture site.

19. The sealing element claim 1, wherein the sealing element is slotted at least in some sections or throughout for connection of one or more of a conveying device, an injection cannula, or preferably a pin, at the outer side of the sealing element to pierce the sealing element, such that when the sealing element is pushed aside, wherein the ring collar remains on a holding device of a sealing cap and the sealing element is held in position on the sealing cap, such that when the conveying device is removed from the sealing cap, then the sealing element automatically closes as a resealable element, so that the opening of the sealing cap is in turn sealed against passage of liquid out of the container.

20. A sealing element for a connection device of a container for holding a medical liquid, comprising a sealing head, on an outer side of the sealing element, a sealing body adjoining the sealing head, and a ring collar connected to the sealing body via a flange, wherein the outer side of the sealing element is substantially flat and disposed above a top side of the ring collar, wherein on the top side of the ring collar and/or on a bottom side of the ring collar, a plurality of spacers are arranged distributed over the periphery.

* * * * *